April 5, 1949.    N. G. ARCHER    2,466,068

ROLLER DRIVING GEAR

Filed April 17, 1945

Inventor
NATHAN G. ARCHER

By *Clarence A. O'Brien and Harvey B. Jacobson*
Attorneys

Patented Apr. 5, 1949

2,466,068

UNITED STATES PATENT OFFICE 2,466,068

ROLLER DRIVING GEAR

Nathan G. Archer, Lockbourne, Ohio

Application April 17, 1945, Serial No. 588,875

2 Claims. (Cl. 74—243)

This invention relates to tractors of the Caterpillar or crawling endless track type and has for an object to provide means whereby the idler rollers of such a traction mechanism will be positively and constantly rotated when the tractor is in motion.

Another object of the invention is to provide track idler rollers with fixed gears to be positively rotated by the track mechanism.

A further object of this invention is to provide track supporting and slack take-up rollers so formed as to be positively rotated by the track moving thereover.

A still further object of my invention is to provide a track upper idler roller with a sectional detachable gear adapted to be driven by track pins or substitutes therefor which gear may be quickly replaced when worn.

Other features and advantages will become more readily apparent from the following description and the accompanying illustrative drawings in which.

Figure 3:
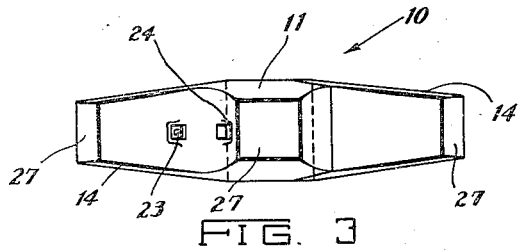
Figure 3 is an edge view of a gear forming a primary part of my invention.
Figure 1:
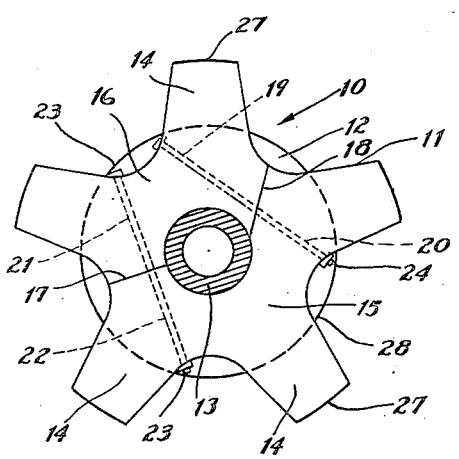
Figure 1 is a side elevational view of my improved idler.
Figure 2:
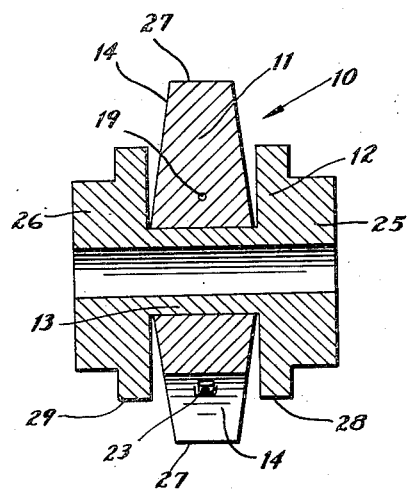
Figure 2 is a transverse sectional view thereof.
Figure 4:
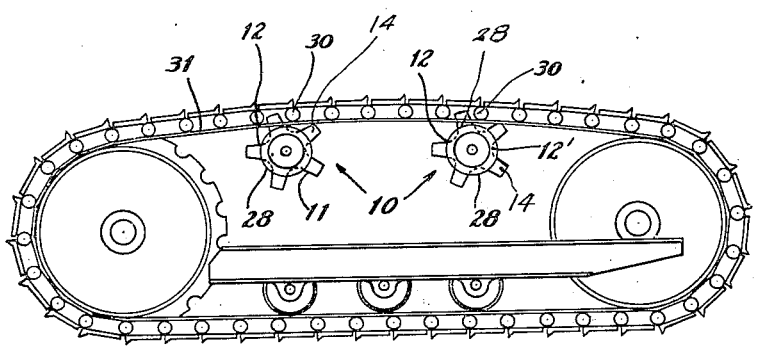
Figure 4 is a side elevational view of a crawler type traction equipment embracing my invention.

The same reference characters used in the drawings and the following specification refer to the same parts throughout and in which 10, indicates my invention which consists of a gear 11, and a track carrier roller member 12, upon the hub 13, on which the gear 11, is fixedly mounted. This gear 11, is provided with a series of crown teeth 14, the number of which may be varied according to the particular type of track to be accommodated. The gear is divided into two sections 15 and 16, in order that it may be quickly replaced in case of injury or breakage. The gear is cut on the lines 17 and 18 (see Figure 1) in order that each section will extend 180° or one half of the shaft or hub 13. It is obvious that any angular division of the gear which will answer the same purpose may be substituted.

The sections 15 and 16, of said gear 11, are provided with aligning bores 19 and 20, and 21 and 22 (shown dotted in Figure 1) to receive the bolts 23 and 24, with which said sections are secured upon the shaft 13.

The roller member 12, is formed of two rundles 25 and 26, connected by the integral hub 13, and upon which as before stated the gear 11, is fixed. The outer ends 27, project far enough beyond the peripheries 28 and 29, of the rundles to be engaged by the pins 30, of the crawler track 31, which the members 12, sustains in its up position.

Heretofore idler rollers have been used to carry the upper portion of the track of a Caterpillar or crawler and from long experience with this type of tractors I have found that from various causes, for instance clogging up of the running gear, the top idlers or carrier rollers often fail to rotate, which results in flattened surfaces thereon due to their remaining stationary and the track dragging thereover. This condition makes it often necessary to change the rollers, which requires very considerable time and it was due to such condition that I have invented the above device for a forced rotation of the rollers as long as the track moves. When it does become necessary to change a gear or a roller it may be done in comparatively short order.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A device of the character described including a pair of spaced integrally formed outwardly and downwardly stepped rollers having a reduced hollow hub between said rollers, a transverse split gear on said hub, locking means extending longitudinally through said split gear terminating in the spaced slots between the gear teeth, and said teeth being outwardly tapered on their opposite side and end surfaces.

2. A device of the character described including a pair of spaced integrally formed outwardly and downwardly stepped rollers having a reduced hollow hub, a transversely split gear detachably supported on said hub and formed with a thickened portion surrounding its central bore completely filling the hub space between said stepped rollers, and locking means extending longitudinally through said split gear to support the same on said hub.

NATHAN G. ARCHER.

REFERENCES CITED

The following references are of record in the file of this patent:

UNITED STATES PATENTS

| Number | Name | Date |
|---|---|---|
| 476,303 | Potter | June 7, 1892 |
| 1,244,383 | Snider | Oct. 23, 1917 |
| 1,431,374 | Cullman | Oct. 10, 1922 |
| 1,508,446 | Diehl | Sept. 16, 1924 |
| 1,623,814 | Scott | Apr. 5, 1927 |
| 2,107,490 | Mayne | Feb. 8, 1938 |